United States Patent
Yokoyama et al.

(10) Patent No.: US 6,625,147 B1
(45) Date of Patent: Sep. 23, 2003

(54) COMMUNICATIONS NETWORK CONTROL SYSTEM

(75) Inventors: Ken Yokoyama, Kawasaki (JP); Takeshi Aoki, Tama (JP); Eiichi Takahashi, Kawasaki (JP); Shinji Kikuchi, Kawasaki (JP); Tsuneo Katsuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/390,651

(22) Filed: Sep. 7, 1999

(30) Foreign Application Priority Data

Sep. 8, 1998 (JP) .................... 10-254380

(51) Int. Cl.⁷ .................... H04L 12/28
(52) U.S. Cl. .................... 370/389; 370/466; 370/487; 713/200
(58) Field of Search .................... 370/338, 352, 370/400, 401, 466, 467, 389, 487; 713/200, 201

(56) References Cited

U.S. PATENT DOCUMENTS 5,913,024 A * 6/1999 Green et al. .................... 713/200
6,452,915 B1 * 9/2002 Jorgensen .................... 370/338

* cited by examiner

Primary Examiner—Hassan Kizou
Assistant Examiner—John Pezzlo
(74) Attorney, Agent, or Firm—Staas & Halsey LLP

(57) ABSTRACT

A communications network control system includes a packet judging circuit 412 for judging whether a variable-length packet inputted via a network 12 is a control packet CPKT self-addressed and containing control information for network control, or a transfer packet TPKT that should be transferred to other addresses, and a control information management circuit 512 for receiving the control packet judged to be the control packet by the judging circuit via the network, and managing and processing the control information, based on the received control packet. This system further includes a routing table management circuit 413 for storing the control information transmitted to the network from the management circuit in such a way that the control information can be updated as well as for controlling a transfer of the transfer packet, and a packet rewriting circuit 414 for executing a process of rewriting contents of the transfer packet in accordance with the control information stored in the table management circuit in parallel with a process of the control packet by the information management circuit in order to transfer to another network 13 the transfer packet judged to be the transfer packet by the judging circuit.

16 Claims, 13 Drawing Sheets

SYS2 SECOND COMMUNICATIONS NETWORK SYSTEM

COMMUNICATIONS NETWORK CONTROL SYSTEM

BACKGROUND OF THE INVENTION

The present invention relates to a communications network control system for effectively utilizing networks when connecting a plurality of networks to each other and transferring packets.

In recent years, with developments of Internet and Intranet, it has been a subject in the communications network control system to correspond to a diversification of networking mode and an increase in traffic through mutual connections of networks including a Local Area Network (LAN) and a Wide Area Network (WAN). Network connection devices such as routers and firewalls are needed for performing the network control such as routing access control, quality management and load balancing by connecting the plurality of networks to each other. The router controls the routing in the networks, and the firewall implements the access control in the networks. These connection devices transfer and receive control information of a network control protocol, thus managing the control information on the network. In the case of the router, the network control protocol involves the use of an international standard protocol such as a Routing Information Protocol (RIP) and an Open Shortest Path Fast (OSPF). In the case of the firewall, however, there exist no such international standard protocol at the present. Then, those connection devices connect the networks to each other, i.e., transfer packets, based on the control information of the network control protocol.

In the conventional communications network control system having the network connection device such as the router and the firewall, the packets to be transmitted are a transfer packet containing communications information and a control protocol packet (simply termed a control packet) containing the control information. A receiving-side, more precisely, transferred-side network connection device executes a process of the transfer packet and a process of the control protocol packet on the time-axis sequentially in series. Further, a transfer packet processing function and a control protocol packet processing function, are provided in a physically singly structured network connection device.

Thus, in the conventional network connection device, the function of controlling the network and the function of transferring the packets are integrally structured with no clear distinction therebetween, and the process for the control protocol packet and the process for the transfer packet are executed on the time-axis in series. Therefore, if any one of the processes exhibits a high load, there might be caused a delay and queuing in the other process. More specifically, the control protocol packet is being processed, during which the transfer packet can not be processed, and in the meantime the packet transfer might be delayed. This packet transfer delay turns out to be a delay of the network control. Further, a box body of the physically singly structured device incorporates the network control function and the packet transfer function, and hence there must be a less degree of freedom in terms of the architecture of the communications network control system.

SUMMARY OF THE INVENTION

Accordingly, it is a primary object of the present invention to provide a communications network control system capable of dispersing a processing load by separating a network control function from a packet transfer function which have hitherto been united into one function, or by separating a physically singly structured network connection device incorporating these functions into different devices (a network control device and a packet transfer device) corresponding to the functions.

It is another object of the present invention to provide a communications network control system capable of keeping a compatibility with conventional devices on a network even by separating the network control function from the packet transfer function which have hitherto been united into one function or by separating the singly structured device into different devices.

It is still another object of the present invention to provide a communications network control system capable of performing communications between the separated functions or between the devices described above. This object is intended to cope with a constraint that there is not so much degree of freedom in terms of an installation space because of a necessity for setting a packet transfer function and a device corresponding to the packet transfer function at points where a plurality of networks are connected to each other, and with a restraint that it is desirable to avoid the installation in a place with a comparatively low reliability because a network control function and a device corresponding to this function require storage devices such as hard disks for storing an enormous quantity of software in many cases.

It is a further object of the present invention to provide a communications network control system capable of ensuring a communications security because it is easy to lose a confidentiality when transmitting and receiving vital items of information such as control information on normal networks.

To accomplish the above objects, according to one aspect of the present invention, a communications network control system comprises a judging unit for judging whether a variable-length packet inputted via a first network is a control packet self-addressed and containing control information for network control, or a transfer packet addressed otherwise, a first managing unit for receiving the control packet judged to be the control packet by the judging unit via a communications medium, and managing and processing the control information, based on the received control packet, a second managing unit for storing the control information transmitted to the communications medium from the first managing unit in such a way that the control information can be updated as well as for controlling a transfer of the transfer packet, and a rewriting unit for executing a process of rewriting contents of the transfer packet in accordance with the control information stored in the second managing unit, in parallel with a process of the control packet by the first managing unit in order to transfer to a second network the transfer packet judged to be the transfer packet by the judging unit.

In this construction, the first managing unit may be provided in a first device, and the judging unit, the second managing unit and the rewriting unit may be provided in a second device having a physically different configuration from the first device. Further, the communications medium may involve the use of the first network, and a cable through which the first device and the second device are capable of communicating with each other. Each of the first device and the second device may further include a control packet encrypting/decrypting unit for making confidential the communications via the first network.

According to another aspect of the present invention, a communications network control system comprises a judging unit for judging whether a variable-length packet inputted via a network is a control packet self-addressed and containing control information for network control, or a transfer packet addressed otherwise, a first managing unit for receiving the control packet judged to be the ;control packet by the judging unit via a communications medium, and managing and processing the control information, based on the received control packet, a second managing unit for storing the control information transmitted to the communications medium from the first managing unit in such a way that the control information can be updated as well as for controlling a transfer of the transfer packet, and a rewriting unit for executing a process of rewriting contents of the transfer packet in accordance with the control information stored in the second managing unit in parallel with a process of the control packet by the first managing unit in order to transfer to the other network the transfer packet judged to be the transfer packet by the judging unit. The first managing unit is provided in at least one network control device. The judging unit, the second managing unit and the rewriting unit are provided in at least one packet transfer device. The communications medium is one of one of the network and the other network, and the cable through which the network control device and the packet transfer device are capable of communicating with each other.

According a further aspect of the present invention, a communications network control method comprises a first step of judging whether a variable-length packet inputted via a first network is a control packet self-addressed and containing control information for network control, or a transfer packet addressed otherwise, a second step of receiving the control packet judged to be the control packet in the first step via a communications medium, and managing and processing the control information, based on the received control packet, a third step of storing the control information transmitted to the communications medium by the process in the second step in such a way that the control information can be updated as well as for controlling a transfer of the transfer packet, and a fourth step of executing a process of rewriting contents of the transfer packet in accordance with the control information stored in the third step, in parallel with a process of the control packet in the second step in order to transfer to a second network the transfer packet judged to be the transfer packet in the first step.

BRIEF DESCRIPTION OF THE DRAWINGS

These objects and advantages of this invention will become more apparent and more readily appreciated from the following detailed description of the presently preferred exemplary embodiments, taken in conjunction with the accompanying drawings of which.

DETAILED DESCRIPTION OF THE PREFERRED EMBODIMENTS

Figure 1:
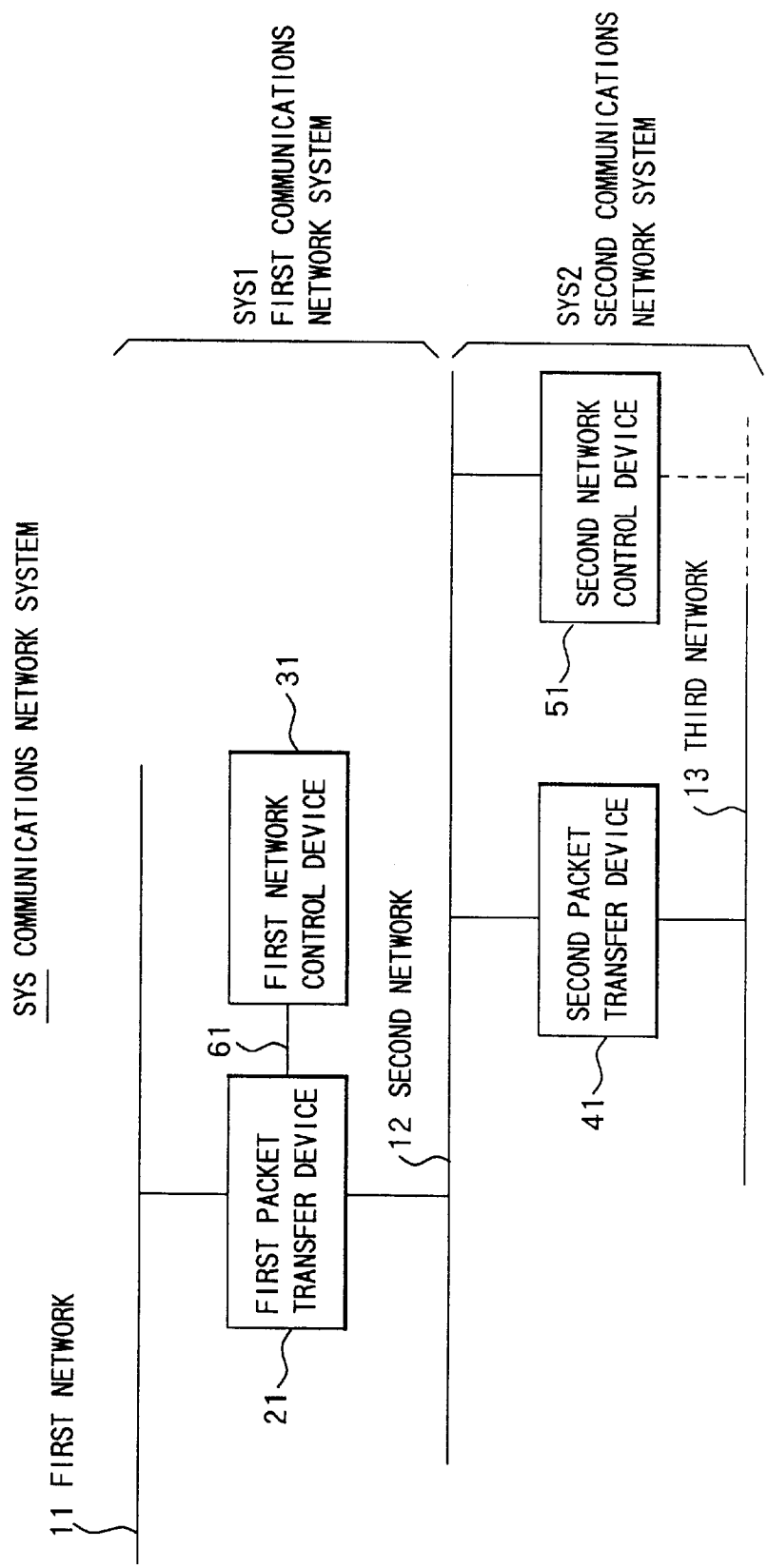
FIG. 1 is a block diagram showing one example of an architecture of a whole communications network control system according to the present invention.

FIG. 1 shows one example of a whole architecture of a communications network control system in accordance with first through fifth embodiments of the present invention. Referring to FIG. 1, a communications network control system SYS includes a first network 11, a second network 12 and a third network 13. A first packet transfer device 21 is disposed between the first network 11 and the second network 12. A first network control device 31 is connected to the packet transfer device 21. A second packet transfer device 41 is disposed between the second network 12 and the third network 13. Further, a second network control device 51 is connected to the second network 12.

The first packet transfer device 21 connects the network 11 to the network 12, and performs routing of an internetwork packet transfer at a high speed. The first network control device 31 manages information for controlling the network and, based on this item of control information, controls the packet transfer device 21. The packet transfer device 21 is connected via a communications path 61 using a cable to the network control device 31. This architecture of the first communications network control system SYS1 will be explained in details later on by way of the first embodiment.

Further, the second packet transfer device 41 connects the network 12 to the network 13, and implements routing of the internetwork packet transfer at the high speed. The second network control device 51 manages the information for controlling the network and, based on this item of control information, controls the packet transfer device 41. The packet transfer device 41 is connected via the network 12 to the network control device 51. The architecture of the second communications network control system SYS2 will hereinafter be explained in details by way of the second through fifth embodiments.

In the communications network control system SYS described above, the network control device 31 and the network control device 51 transmit and receive a network control protocol such as an RIP (Routing Information Protocol), and operate in linkage. The first packet transfer device 21 and the first network control device 31, and the second packet transfer device 41 and the second network control device 51, are physically separately structured devices such as a router and a firewall for connecting the networks.

Figure 2:
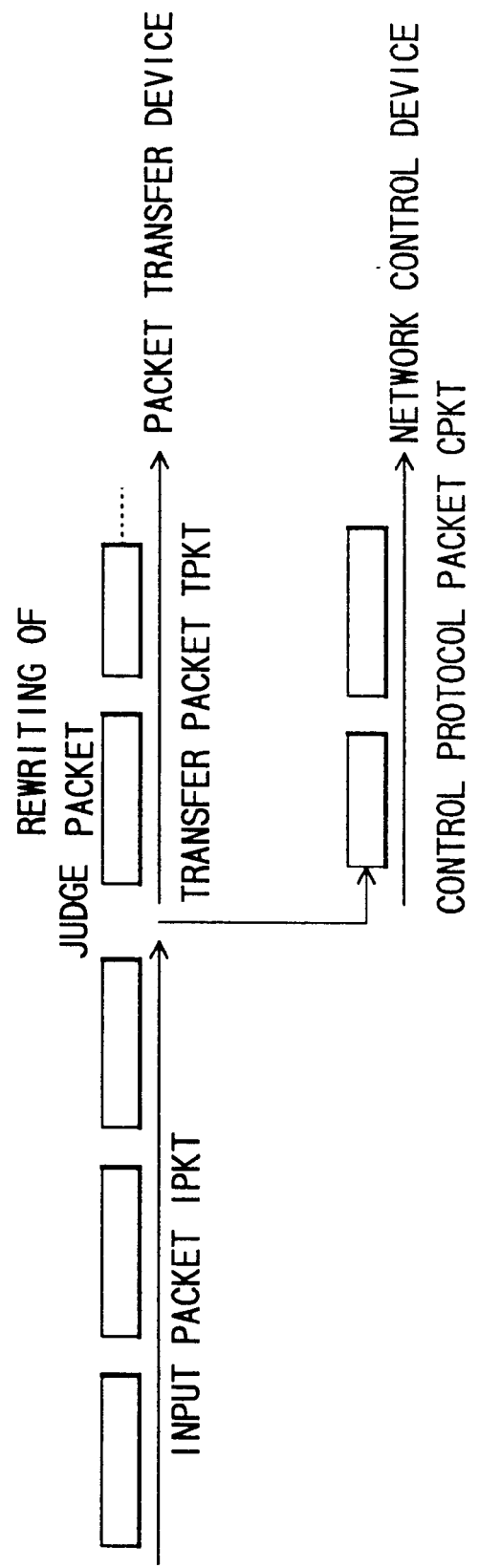
FIG. 2 is an explanatory diagram showing a packet process in the control system in FIG.1.

Herein, an outline of the packet processing in the communications network control system SYS illustrated in FIG. 1, is described in conjunction with FIG. 2. In the communications network control system SYS shown in FIG. 1, it is the same as the prior art system that a transfer packet containing communications information and a control protocol packet (control packet) containing control information are transferred and received with no distinction via the same network. According to the control system in each of the embodiments of the present invention, however, each of the packet transfer devices 21, 41 judges whether an input packet IPKT to be transmitted is categorized as a transfer packet TPKT or a control protocol packet CPKT. If classified as the control protocol packet CPKT, this packet CPKT is transferred to the network control devices 31, 51, wherein the packet is processed. By contrast, if judged to be the transfer packet TPKT, the packet transfer devices 21, 41 immediately process the next input packet IPKT without waiting for the control protocol packet CPKT to be processed, and therefore a delay of the packet transfer can be minimized.

The network control devices 31, 51 creates, based on the control protocol packet CPKT, a control message CMSG for transferring the packet, and have a routing table (a transfer information management table) rewritten, which serve to set the routing for the packets possessed by the packet transfer devices 21, 41. The packet transfer devices 21, 41 are devices dedicated to process the packets at the high speed with reference to the routing table. The network control devices 31, 51 are devices dedicated to execute intricate network control, based on the control protocol packet CPKT. Both sets of the packet transfer devices 21, 41 and the network control devices 31, 51 transfer and receive the control protocol packet and the control information (the control message), and are thereby capable of asynchronously operating in parallel.

(First Embodiment)

Figure 3:
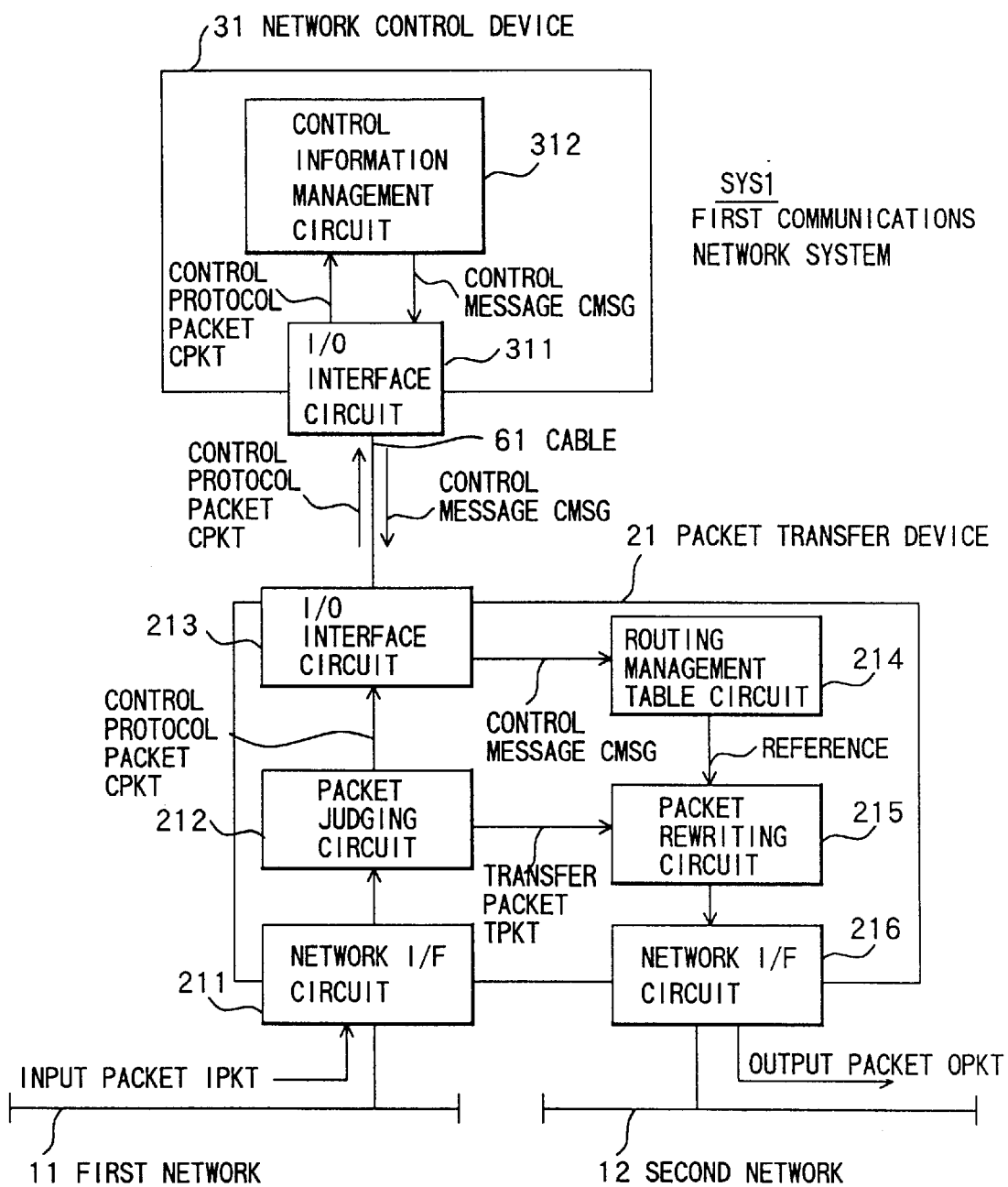
FIG. 3 is a block diagram showing an architecture of a control system in a first embodiment of the present invention.

FIG. 3 shows an architecture of the communications network control system in a first embodiment of the present invention. This control system corresponds to the first communications network control system SYS1 in the communication network control system SYS shown in FIG. 1. The first embodiment will deal with the network control incorporating a routing function of controlling the routing in the networks.

Referring to FIG. 3, in the communications network control system SYS1, the first network 11 is connected via the first packet transfer device 21 to the second network 12, and further the first network control device 31 is connected via a cable (e.g., a fiber cable) 61 to the packet transfer device 21. The packet transfer device 21 includes a network interface circuit 211 for a connection to the first network 11, and a packet judging circuit 212, connected to this network interface circuit 211, for making a judgement as to a category of the input packet IPKT with a variable length which is transmitted from the first network 11. Furthermore, the packet transfer device 21 has an input/output (I/O) interface circuit 213 for a connection to the network control device 31. The I/O interface circuit 213 transmits to the network control device 31 the control protocol packet CPKT for controlling the routing selected based on the judgement made by the packet judging circuit 212, and receives the control message CMSG from the network control device 31.

Further, the packet transfer device 21 includes a routing table management circuit 214 for managing the transfer information rewritten based on the control message CMSG received from the network control device 31. This routing table management circuit 214 has, as will be explained in detail later on, information for specifying a transmission route to a destination to which the transfer packet TPKT is transferred. The packet transfer device 21 includes a packet rewriting circuit 215 for rewriting the transfer route for the transfer packet TPKT which is selected by the packet judging circuit 212 with reference to contents in the routing table management circuit 214. The packet transfer device 21 also has a network interface circuit 216 for a connection to the second network 12, and transmits to the second network 12 the transfer packet TPKT rewritten by the packet rewriting circuit 215 as an output packet OPKT via the network interface circuit 216.

The network control device 31 includes an I/O interface circuit 311 connected via a cable 61 to the I/O interface circuit 213 of the packet transfer device 21. Furthermore, the network control device 31 has a control information management circuit 312 for receiving and processing the control protocol packet CPKT transmitted from the packet judging circuit 212 of the packet transfer device 21 via the I/O interface circuit 311, and outputting the control message CMSG.

Figure 4:
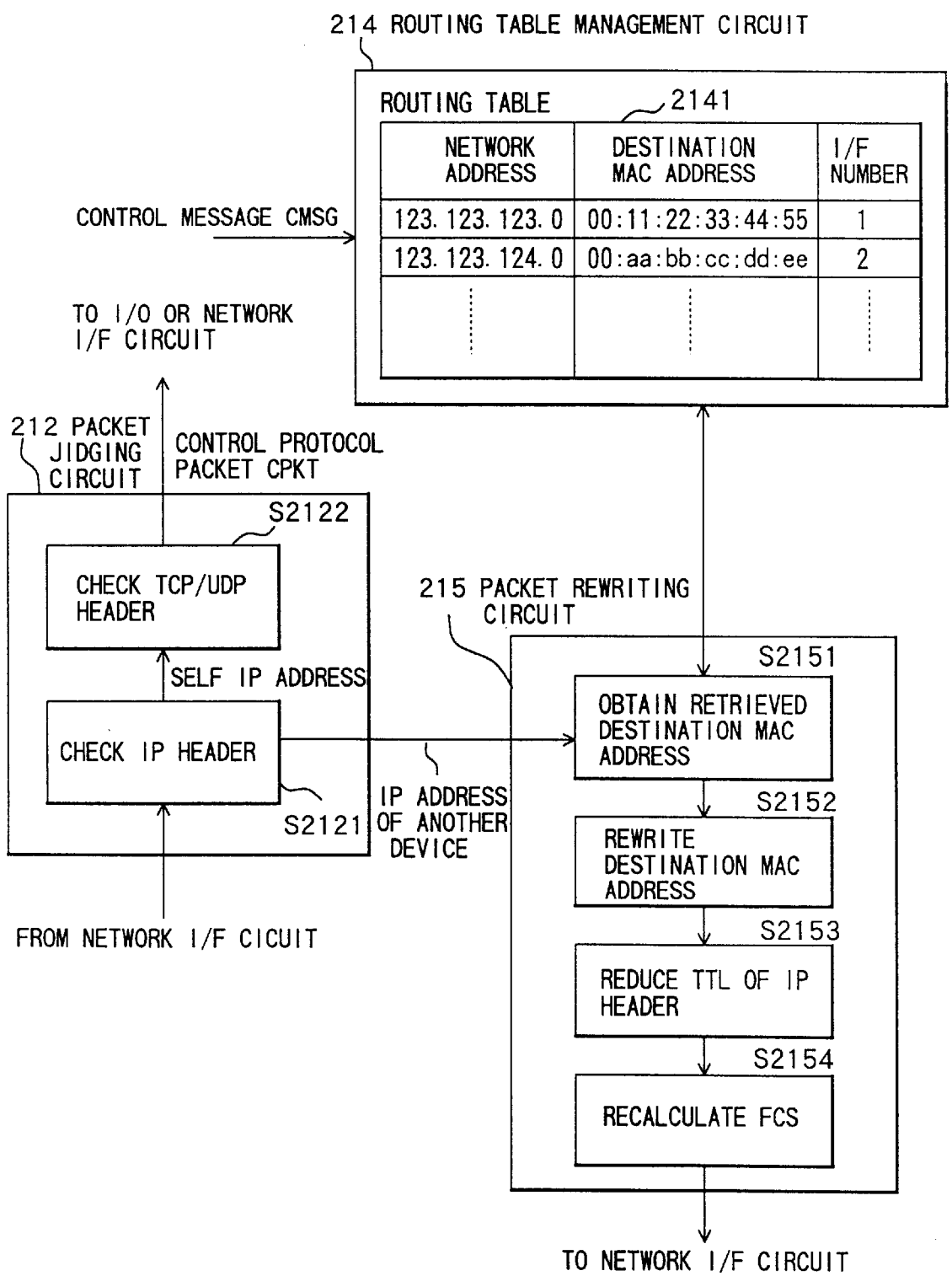
FIG. 4 is an explanatory diagram showing operations of a packet judging circuit, a routing table management circuit and a packet rewriting circuit in the control system shown in FIG. 3.

An operation of the communications network control system SYS1 having the architecture described above, will be explained referring to FIGS. 4 through 7 in conjunction with FIG. 3. In this control system SYS1, the input packet IPKT inputted to the network interface circuit 211 of the packet transfer device 21 from the first network 11, is transmitted to the packet judging circuit 212. The packet judging circuit 212, to begin with, checks an IP (Internet Protocol) header of the input packet IPKT, and judges whether or not a destination IP address is an IP address allocated to the self-device (a processing step S2121 in FIG. 4). As a result, the packet judging circuit 212, if judged to be the destination IP address to the self-device, judges whether or not the input packet IPKT is the control protocol packet CPKT of the routing protocol by checking a TCP/UDP (Transmission Control Protocol/User Datagram Protocol) header (S2122). For example, a judgement as to whether or not the input packet is the control protocol packet CPKT of the routing protocol RIP is made based on a content of a port number of the UDP header of the IP packet taking a frame structure shown in FIG. 7. Herein, the input packet is judged to be the control protocol packet CPKT if the port number of the UDP header is "520". When the input packet IPKT is the control protocol packet CPKT of the routing protocol RIP, this control protocol packet CPKT is transferred to the I/O interface circuit 213 from the packet judging circuit 212. Further, the packets excluding this packet category, i.e., if judged to be packets having IP addresses of other devices by the packet judging circuit 212, those packets are transferred as the transfer packets TPKT (see FIG. 5) to the packet rewriting circuit 215. Note that if judged as packets other than the control protocol packet CPKT and the transfer packet TPKT, these packets are discarded as invalid packets in the packet judging circuit 212.

The control protocol packet CPKT of the routing protocol is transferred to the I/O interface circuit 311 of the network control device 31 via the cable 61 for connecting the packet transfer device 21 to the network control device 31. The control information management circuit 312 of the network control device 31 receives the control protocol packet CPKT and, based on routing control information, i.e., RIP data contained in the control protocol packet CPKT, creates the control message CMSG for updating a routing table 2141 in the routing table management circuit 214 of the packet transfer device 21. Entry add and delete commands to the routing control table 2141 may be exemplified by way of this control message CMSG. The control message CMSG is transferred to the interface circuit 311, and further transferred via the cable 61 to the interface circuit 213 of the packet transfer device 21.

Figure 5:
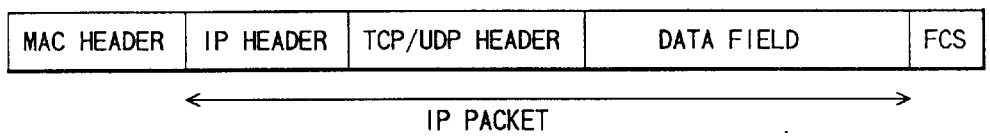
FIG. 5 is a diagram showing a frame structure of an input packet (a control protocol packet and a transfer packet) in the control system shown in FIG. 3.
Figure 7:
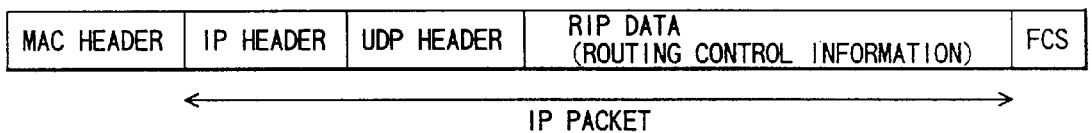
FIG. 7 is a diagram showing one example of a frame structure of the control protocol packet in the control system shown in FIG. 3.
Figure 6:
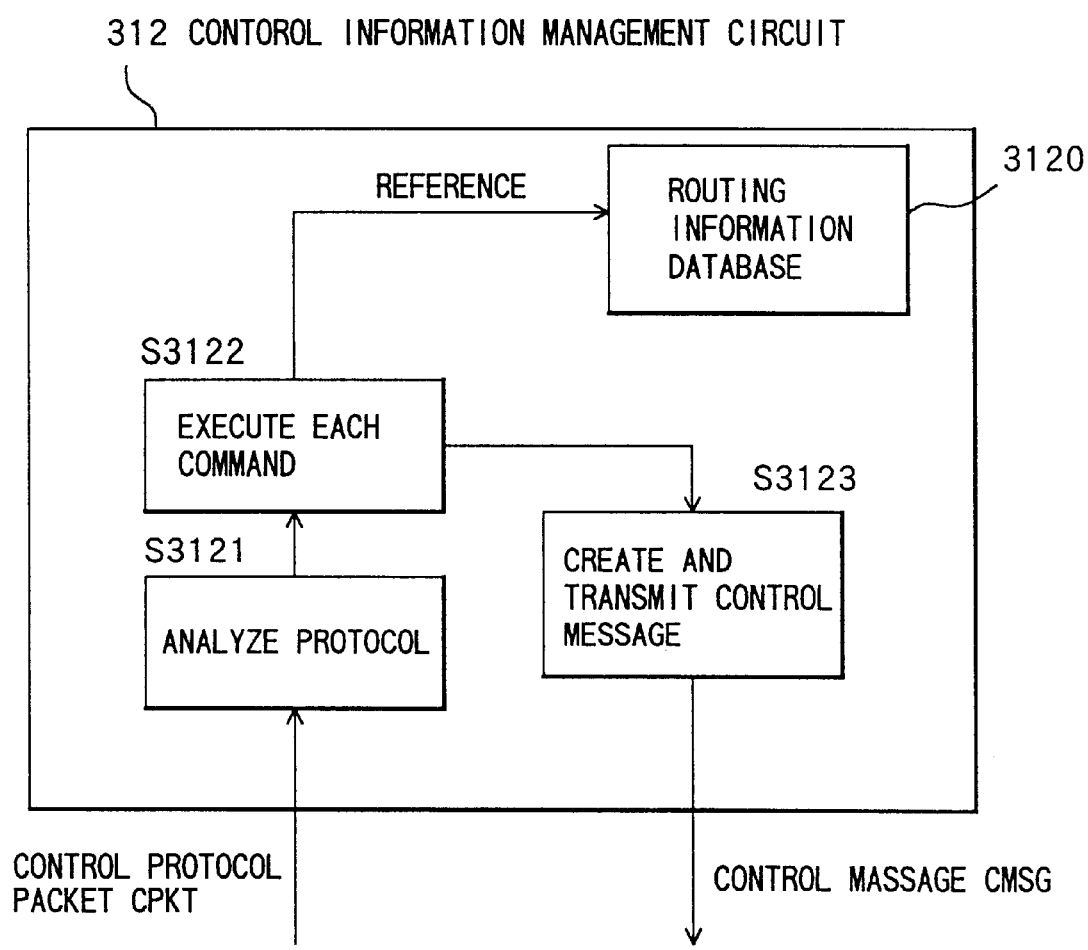
FIG. 6 is an explanatory diagram showing an operation of a control information management circuit in the control system shown in FIG. 3.

To give a further description thereof referring to FIG. 6, the control information management circuit 312, upon receiving the control protocol packet CPKT having the frame structure shown in FIG. 7, analyzes the protocol on the basis of contents of the routing information (processing step S3121). As a result of the analysis, the process circuit 312 executes a command, based on the routing control information, i.e., the RIP data (S3122). This item of RIP data contains a variety of control commands, IP network numbers, a hop count (which implies the number of bridges, exceeding the routers) with respect to the IP address. The management circuit 312 refers to a routing information database 3120 when executing each command. If there is a necessity for updating the routing table 2141 of the packet transfer device 21 after executing the command, the control message CMSG is created (S3123). The created control message CMSG has a structure corresponding to a data part of the input packet IPKT shown in FIG. 5.

Referring again to FIG. 4, the routing table 2141 of the routing table management circuit 214 is stored with data for controlling the routing in the networks, and a destination MAC (Media Access Control) address and a network interface circuit number can be retrieved, wherein a network address corresponding to the destination IP address serves as a key. The routing table management circuit 214 receives the control message CMSG from the interface circuit 213, and updates the routing table 2141 in accordance with the control message CMSG.

The packet rewriting circuit 215 determines, based on the transfer packet TPKT transferred from the packet judging circuit 212, the routing in the networks with reference to the routing table 2141 of the routing table management circuit 214, and rewrites contents of the transfer packet TPKT. The rewritten transfer packet TPKT is transferred as an output packet OPKT to the second network 12 via the network interface circuit 216. Note that when the transfer packet TPKT is processed by the packet rewriting circuit 215 while the control protocol packet CPKT transferred anterior to the transfer packet TPKT is processed by the control information management circuit 312, there might occur such an event that the control information contained in the control protocol packet CPKT is not yet reflected in the routing table 2141. In this case, the packet rewriting circuit 215 executes a process of rewriting the transfer packet TPKT in accordance with the old control information before being reflected therein.

The frame of the transfer packet TPKT inputted to this packet rewriting circuit 215 has, as shown in FIG. 5, such a structure that a MAC header and an FCS (Frame Check Sequence) are added to the IP packet with the IP header and the TCP/UDP header being added to a data field. Herein, the MAC header contains a destination MAC address, a transmission originating MAC address and a frame length, and is added to the IP packet, whereby the packet can be transferred and received on a communications medium. Further, the IP header contains a destination address, a transmission originating IP address, a packet length, a high-order protocol type (of TCP/UDP etc) and a TTL (Time-to-Live) indicating a life-span of the packet, and is used for controlling the routing in the network layers. The TCP/UDP header is a header of the TCP/UDP defined as a higher-order protocol than the IP, and is used for perform the communications on the transport layer. Further, the FCS is a frame checksum of the packet, and is sued for a frame error detection of the packet.

Accordingly, the packet rewriting circuit 215 obtains from the routing table management circuit 214 a destination MAC address corresponding to the destination IP address of the IP header contained in the transfer packet TPKT given from the packet judging circuit 212, and rewrites the transfer packet TPKT (S2151, S2152). Further, the packet rewriting circuit 215 subtracts the TTL in the IP header contained in the transfer packet TPKT (S2153), then recalculates the FCS (S2154), and rewrites the transfer packet TPKT.

As described above, the transfer packet TPKT inputted from the first network 21 is rewritten based on the routing protocol of the control protocol packet CPKT, and transferred to the second network 31.

In the communications network control system SYS1, the control protocol packet CPKT and the transfer packet TPKT can be processed separately. That is, the control information management circuit 312 of the network control device 31 executes the process of the routing control protocol, during which the packet transfer device 21 executes the process of rewriting the transfer packet TPKT with reference to the routing table 2141, and hence there occurs no transfer delay of the transfer packet TPKT as in the prior art. Furthermore, the network control device 31 dedicated to control the network and the packet transfer device 21 dedicated to transfer the packets are separated, and nevertheless communicate with each other, thereby implementing the control of the network. It is therefore feasible to disperse a load of the processing. Moreover, the network control device 31 and the packet transfer device 21 come to have no physical restraint in terms of distance, and can be therefore installed away from each other.

The embodiment given above has dealt with a case of the routing, however, similarly in the case of the quality management, the load balancing and the access control in the network, the control protocol packet CPKT (e.g., an RSVP: Resource Reservation Protocol etc in the case of the quality management control) corresponding to that control, is transferred from the packet transfer device 21 to the network control device 31, and the network control device 31 creates, based on the control protocol packet CPKT, the control message CMSG and transfers it back to the packet transfer device 21, whereby the above control can be carried out.

(Second Embodiment)

Figure 8:
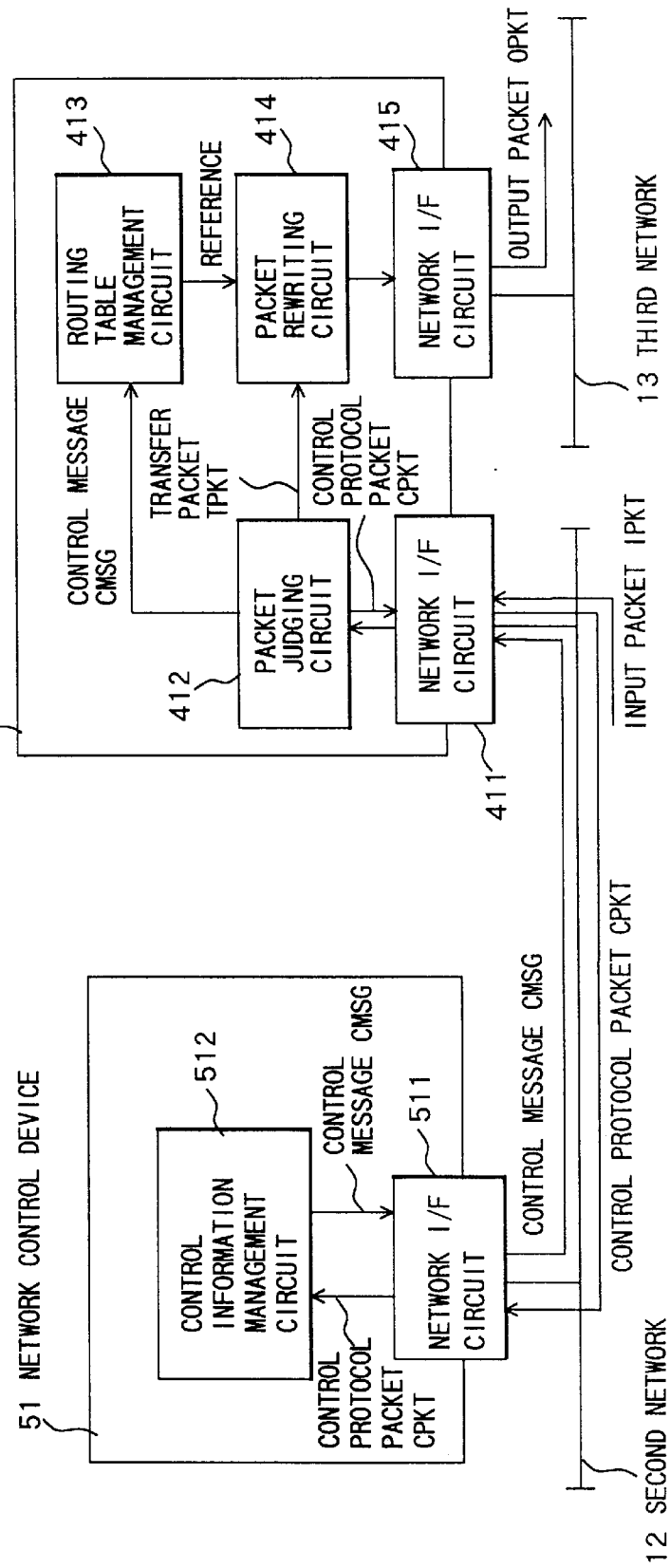
FIG. 8 is a block diagram illustrating an architecture of a control system in a second embodiment of the present invention.

FIG. 8 shows an architecture of the communications network control system in a second embodiment of the present invention. This control system corresponds to the second communications network control system SYS2 in the communication network control system SYS shown in FIG. 1. According to the control system SYS2 in the second embodiment, by contrast with the configuration that the control system SYS1 in the first embodiment discussed above involves the use of the cable 61 as the communications medium between the packet transfer device 21 and the network control device 31, the second network 12 serves as a communications medium between the packet transfer device 41 and the network control device 51. The second embodiment will deal with the network control of this control system SYS2 which incorporates the routing function of controlling the routing in the networks.

Referring to FIG. 8, in the communications network control system SYS2, the second network 12 is connected via the second packet transfer device 41 to the third network 13, and further the second network control device 51 is connected via the second network 12 to the packet transfer device 41. The packet transfer device 41 includes a network interface circuit 411 for a connection to the second network 12, and a packet judging circuit 412, connected to this network interface circuit 411, for making a judgement as to a category of the input packet IPKT transmitted from the second network 12, and for identifying the control message CMSG inputted from the network control device 51. A network interface circuit 411 transmits the control protocol packet CPKT for controlling the routing selected based on the judgement made by the packet judging circuit 412 to the network control device 51 via the second network 12, and receives the control message CMSG from the network control device 51.

Further, the packet transfer device 41 includes a routing table management circuit 413 for managing the transfer information rewritten based on the control message CMSG received from the network control device 51. This routing table management circuit 413 has, as in the case of the routing table management circuit 214 shown in FIG. 4, information for specifying a transmission route to a destination to which the transfer packet TPKT is transferred. The packet transfer device 41 includes a packet rewriting circuit 414 for rewriting the transfer route for the transfer packet TPKT which is selected by the packet judging circuit 412 with reference to contents in the routing table management circuit 413. Further, the packet transfer device 41 also has a network interface circuit 415 for a connection to the third network 13, and transmits to the third network 13 the transfer packet TPKT rewritten by the packet rewriting circuit 414 as an output packet OPKT via the network interface circuit 415.

The network control device 51 includes a network interface circuit 511 connected via the second network 12 to the network interface circuit 411 of the packet transfer device 41. Furthermore, the network control device 51 has a control information management circuit 512 for receiving the control protocol packet CPKT transmitted from the packet judging circuit 412 of the packet transfer device 41 via the network interface circuit 511, then executing a process for a routing information management, and outputting the control message CMSG.

An operation of the communications network control system SYS2 having the architecture described above, will be explained referring to FIGS. 4 through 7 in conjunction with FIG. 8. In this control system SYS2, the input packet IPKT (see FIG. 5) inputted to the network interface circuit 411 of the packet transfer device 41 from the second network 12, is transmitted to the packet judging circuit 412. The packet judging circuit 412, to start with, checks an IP header of the input packet IPKT, and judges whether or not a destination IP address is an IP address allocated to the self-device. As a result, the packet judging circuit 412, if judged to be the destination IP address to the self-device, judges whether or not the input packet IPKT is the control protocol packet CPKT (see FIG. 7) of the routing protocol (e.g., the RIP) by checking a TCP/UDP header. This judging operation is the same as that by the packet judging circuit 212 shown in FIGS. 3 and 4. When the input packet IPKT is the control protocol packet CPKT of the routing control protocol, this control protocol packet CPKT is transferred back to the network interface circuit 411 from the packet judging circuit 412. Further, the packets excluding this packet category, i.e., if judged to be packets having IP addresses of other devices by the packet judging circuit 412, those packets are transferred as the transfer packets TPKT to the packet rewriting circuit 414. Note that if judged as packets other than the control protocol packet CPKT and the transfer packet TPKT, these packets are discarded as invalid packets in the packet judging circuit 412. The packet judging circuit 412 further incorporates a function of identifying the control message CMSG transmitted from the network control device 51, however, this identifying function will be explained later on.

The control protocol packet CPKT of the routing protocol is transferred to the network interface circuit 511 of the network control device 51 via the second network 12 for connecting the packet transfer device 41 to the network control device 51. The control information management circuit 512 of the network control device 51 receives the control protocol packet CPKT and, based on routing control information, i.e., RIP data contained in the control protocol packet CPKT, creates the control message CMSG for updating a routing table (of which an illustration is omitted because of its being structured the same as the routing table 2141 in FIG. 4) in the routing table management circuit 413 of the packet transfer device 41. The control message CMSG is transferred to the interface circuit 511, and further transferred via the second network 12 to the interface circuit 411 of the packet transfer device 41. Note that the control information management circuit 512 receives the control protocol packet CPKT and finally creates the control message CMSG, which process is the same as the process executed by the control information management circuit 312 which has bee described in details referring to FIG. 6. The control message CMSG created herein takes, however, a packet type based on the same frame structure as the input packet IPKT shown in FIG. 5.

The packet judging circuit 412 receiving via the interface circuit 411 the control message CMSG created by the control information management circuit 512, identifies the control message CMSG on the basis of the IP address in the IP header of the control message CMSG of that packet typ and a port number in the TCP/UDP header thereof, and inputs this control message CMSG to the routing table management circuit 413. The routing table of the routing table management circuit 413 is stored with the data for routing in the networks, wherein a destination MAC address and a network interface circuit number can be retrieved, with a network address corresponding to the destination IP address serving as a key. The routing table management circuit 413 receives the control message CMSG from the packet judging circuit 412, and updates the routing table in accordance with this control message CMSG.

The packet rewriting circuit 414 determines, based on the transfer packet TPKT transferred from the packet judging circuit 412, the routing in the networks with reference to the routing table of the routing table management circuit 413, and rewrites contents of the transfer packet TPKT. The rewritten transfer packet TPKT is transferred as an output packet OPKT to the third network 13 via the network interface circuit 415. Note that the process of rewriting the transfer packet TPKT by the packet rewriting circuit 414 is the same as the process by the packet rewriting circuit 215 which has been fully explained referring to FIG. 4.

In the second embodiment, the second network 12 is used as the communication medium between the packet transfer device 41 and the network control device 51, however, the embodiment can also be similarly carried out even by using the third network 13 as a substitute for the second network 12. In this case, the configuration is that the network control device 51 in the second communications network control system SYS2 illustrated in FIG. 1 is, as indicated by the dotted line in FIG. 1, connected not to the second network 12 but to the third network 13.

In the communications network control system SYS2, as in the case of the control system SYS1 in the first embodiment, it is feasible to prevent the transfer delay of the transfer packet TPKT and to disperse the load of the packet processing. Further, the network control device 51 can be connected directly to the existing network (the second network 12), and can be therefore installed much easier without depending on the position of the packet transfer device 41. Hence, the control system architecture exhibiting a high degree of freedom can be taken.

(Third Embodiment)

Figure 9:
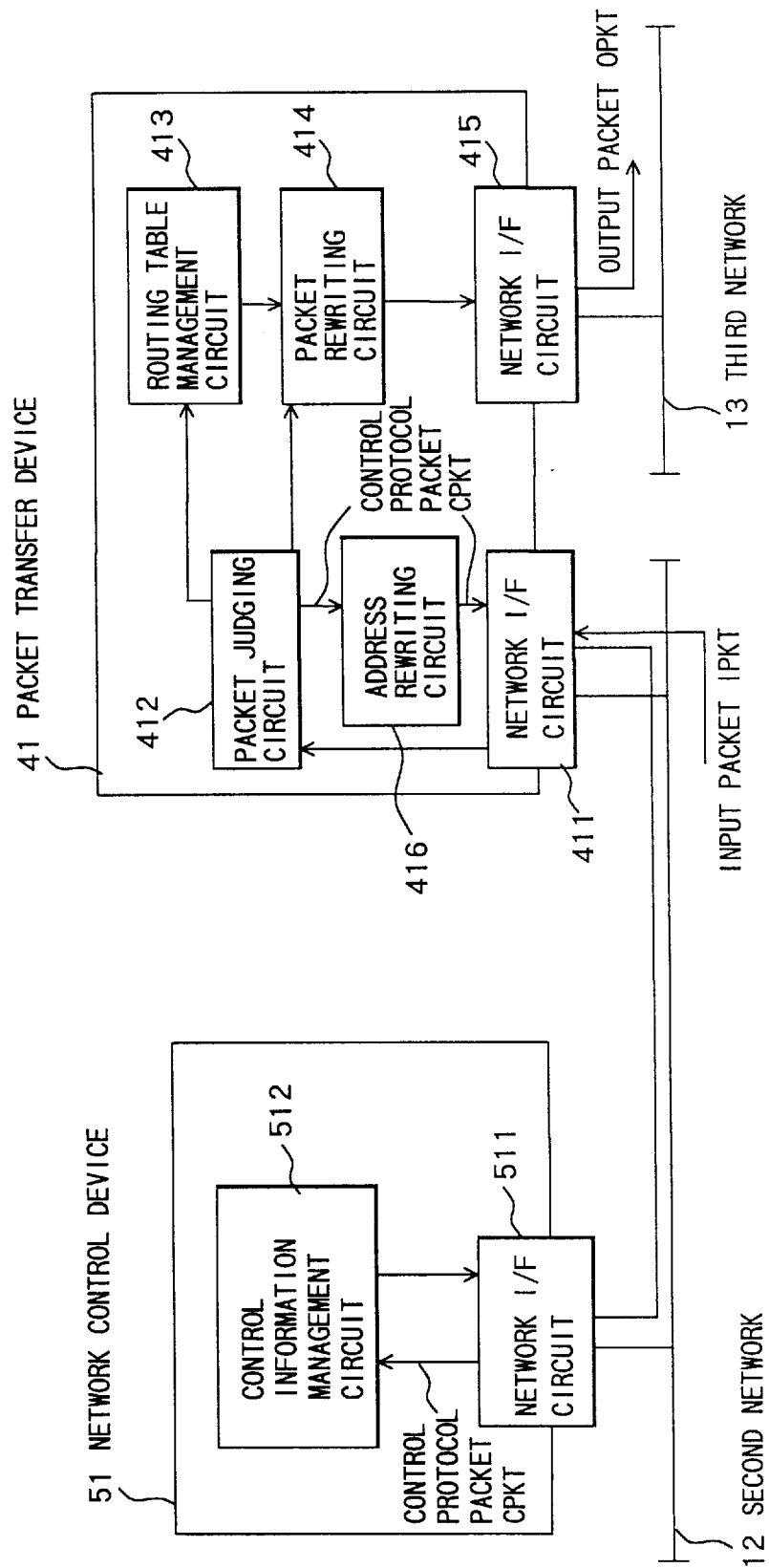
FIG. 9 is a block diagram illustrating an architecture of a control system in a third embodiment of the present invention.

FIG. 9 shows an architecture of the communications network control system in a third embodiment of the present invention. This control system corresponds to the second communications network control system SYS2 in the communication network control system SYS shown in FIG. 1. In the control system SYS2 in the third embodiment, an address rewriting circuit 416 is added to the packet transfer device 41 in the control system SYS2 in the second embodiment discussed above.

Figure 10:
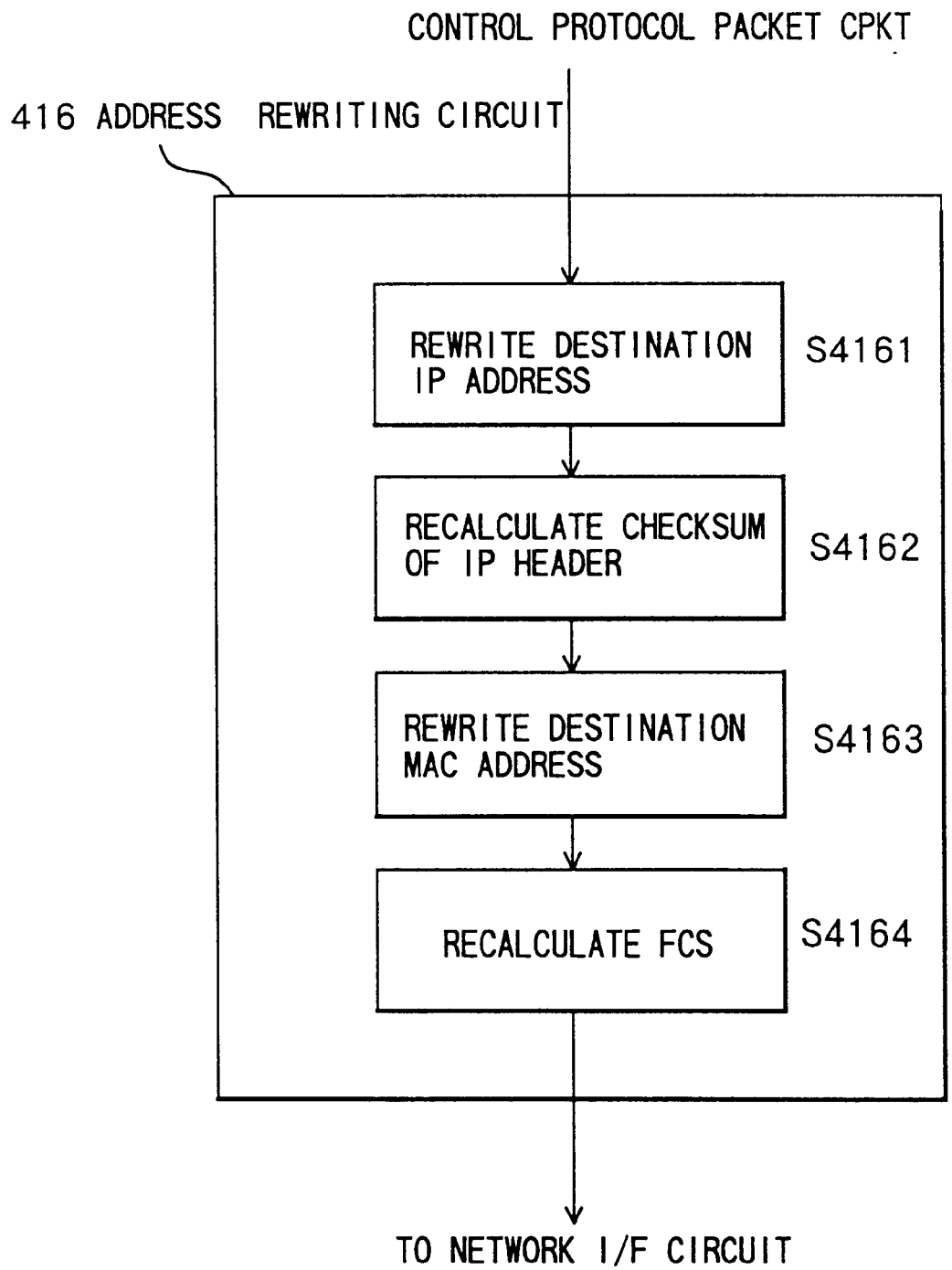
FIG. 10 is an explanatory diagram showing an operation of an address rewriting circuit in the control system shown in FIG. 9.

Referring to FIGS. 9 and 10, in the communications network control system SYS2, the address rewriting circuit 416 is added between the network interface circuit 411 and the packet judging circuit 412 of the packet transfer device 41. When the packet judging circuit 412 judges that the input packet IPKT inputted to the interface circuit 411 of the packet transfer device 41 from the second network 12 is the control protocol packet CPKT, the control protocol packet CPKT of the routing protocol is, before being transmitted to the network control device 51 from the packet transfer device 41, transferred to the address rewriting circuit 416. The address rewriting circuit 416 rewrites the destination IP address of the IP header of the control protocol packet CPKT of the routing protocol, into an IP address of the network control device 51 (a processing step S4161 in FIG. 10), and recalculates a header checksum of the IP header (S4162). Next, the address rewriting circuit 416 rewrites the destination MAC address of the MAC header into a MAC address of the network control device 51 (S4163), and transmits to the interface circuit 411 the control protocol packet CPKT of which the FCS has been recalculated (S4164). Note that other components of which the explanations are omitted herein are the same as those in the second embodiment.

With this construction, the control protocol packet CPKT can be transferred directly to the network control device 51 from the packet transfer device 41. Other network control devices 51 existing on the second network 12 may always transfer the control protocol packets CPKT to the packet transfer device 41. Namely, these devices can be treated the same as the conventional network connection device.

(Fourth Embodiment)

Figure 11:
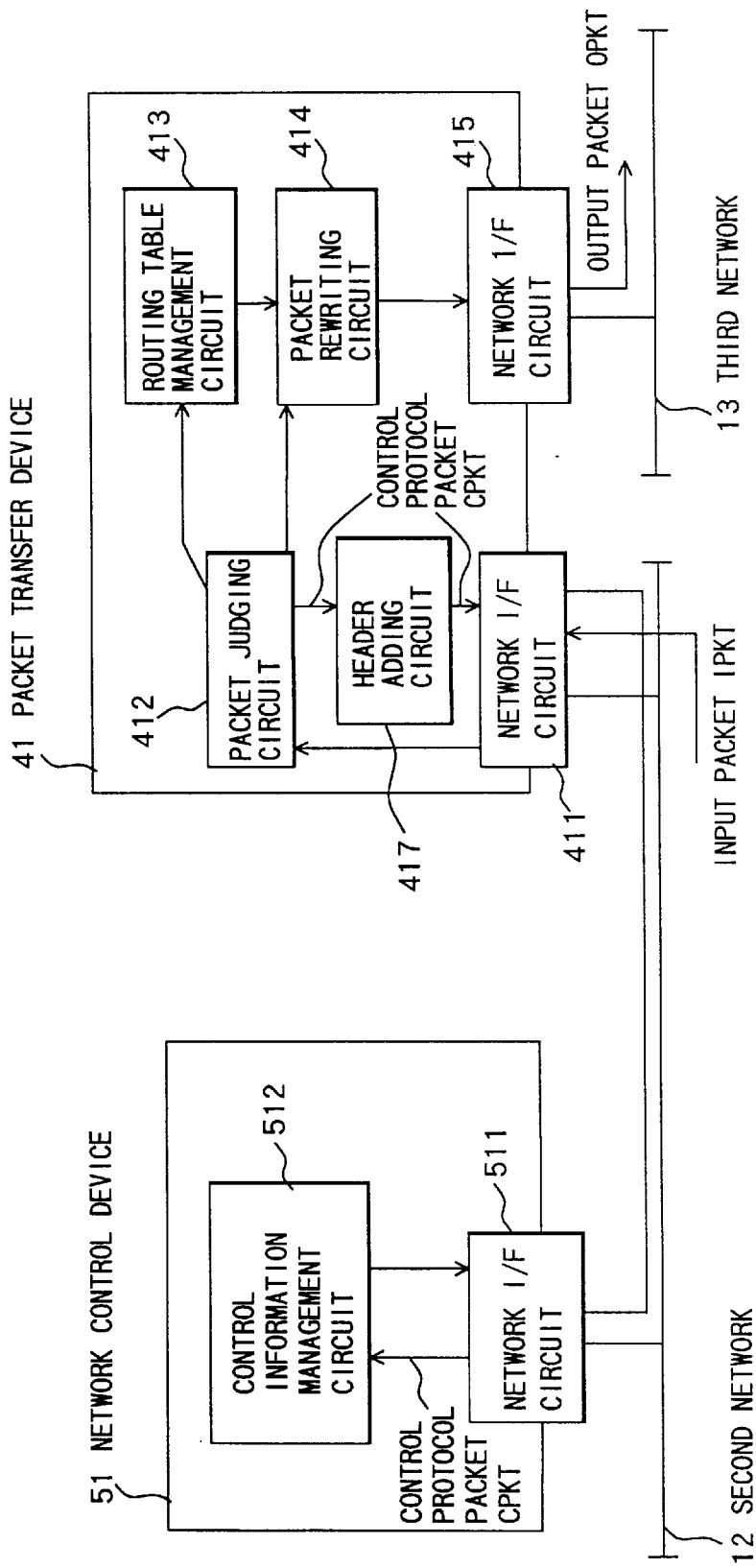
FIG. 11 is a block diagram illustrating an architecture of a control system in a fourth embodiment of the present invention.

FIG. 11 shows an architecture of the communications network control system in a fourth embodiment of the present invention. This control system corresponds to the second communications network control system SYS2 in the communication network control system SYS shown in FIG. 1. In the control system SYS2 in the fourth embodiment, a header adding circuit 417 is added to the packet transfer device 41 in the control system SYS2 in the second embodiment discussed above.

Figure 13:
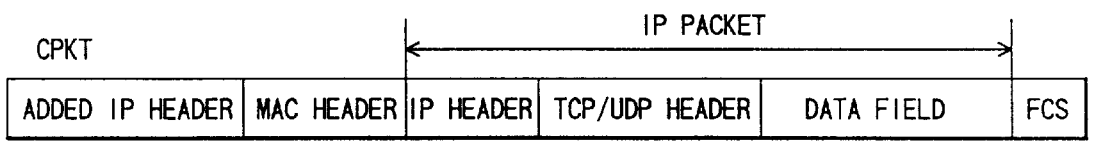
FIG. 13 is a diagram showing a frame structure of the control protocol packet in the control system shown in FIG. 11.
Figure 12:
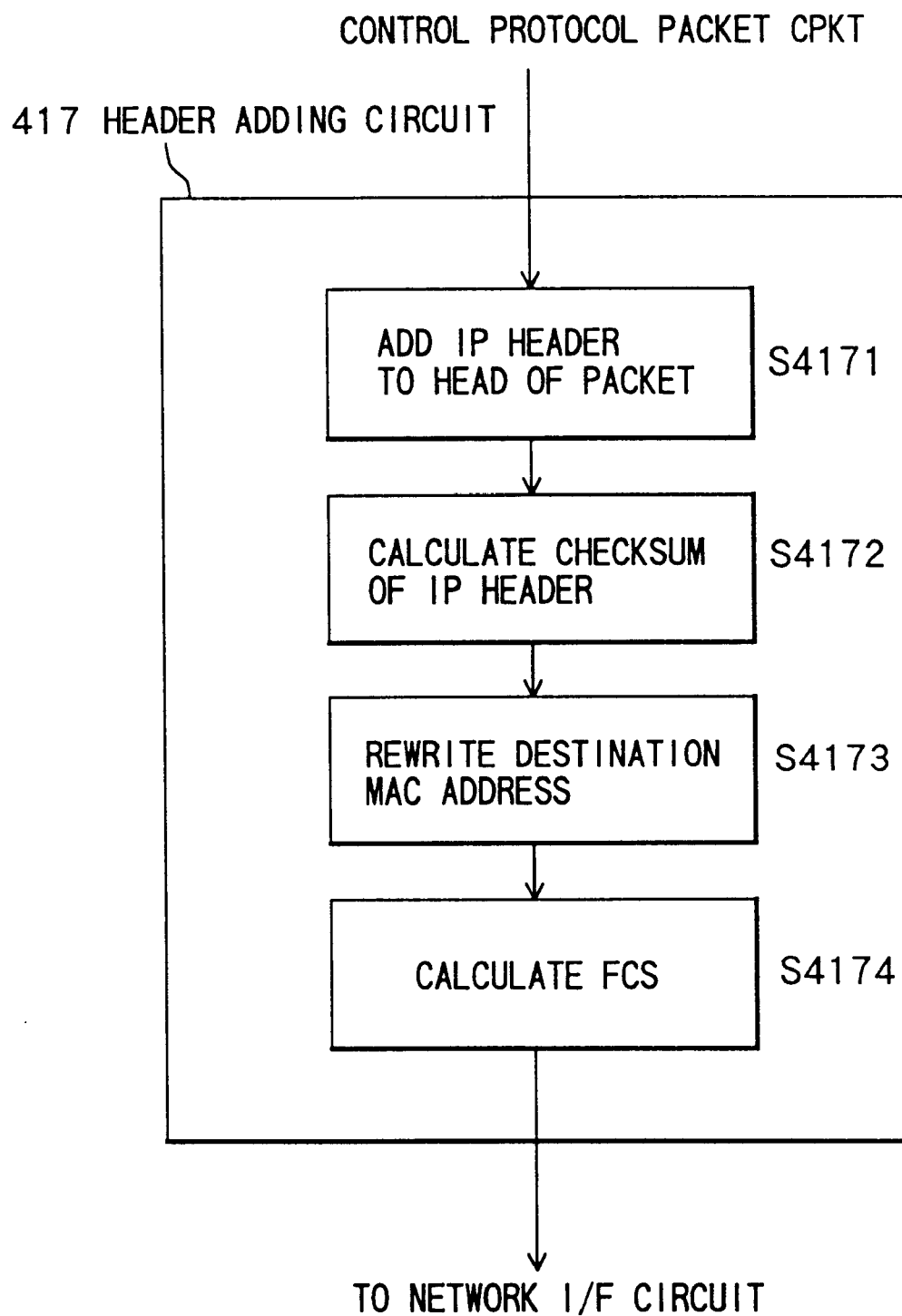
FIG. 12 is an explanatory diagram showing an operation of a header adding circuit in the control system shown in FIG. 11.

Referring to FIGS. 11 to 13, in the communications network control system SYS2, the header adding circuit 417 is added between the network interface circuit 411 and the packet judging circuit 412 of the packet transfer device 41. When the packet judging circuit 412 judges that the input packet IPKT inputted to the interface circuit 411 of the packet transfer device 41 from the second network 12 is the control protocol packet CPKT, the control protocol packet CPKT of the routing protocol is, before being transmitted to the network control device 51 from the packet transfer device 41, transferred to the header adding circuit 417. The header adding circuit 417, as shown in FIG. 13, adds an IP header addressed to the network control device 51 to a head of the control protocol packet CPKT of the routing protocol (a processing step S4171 in FIG. 12), and calculates a header checksum of the added IP header (S4172). Next, the header adding circuit 417 rewrites the destination MAC address of the MAC header into a MAC address of the network control device 51 (S4173), and transmits to the interface circuit 411 the control protocol packet CPKT of which the FCS has been recalculated (S4174). Note that other components of which the explanations are omitted herein are the same as those in the second embodiment.

With this construction, the control protocol packet CPKT can be transferred directly to the network control device 51 from the packet transfer device 41. As in the fourth embodiment, the IP header is added to the head of the control protocol packet CPKT, whereby the processing can be executed faster than the address rewriting process in the third embodiment. Other network control devices 51 existing on the second network 12 may always transfer the control protocol packets CPKT to the packet transfer device 41. Namely, these devices can be treated the same as the conventional network connection device.

(Fifth Embodiment)

Figure 14:
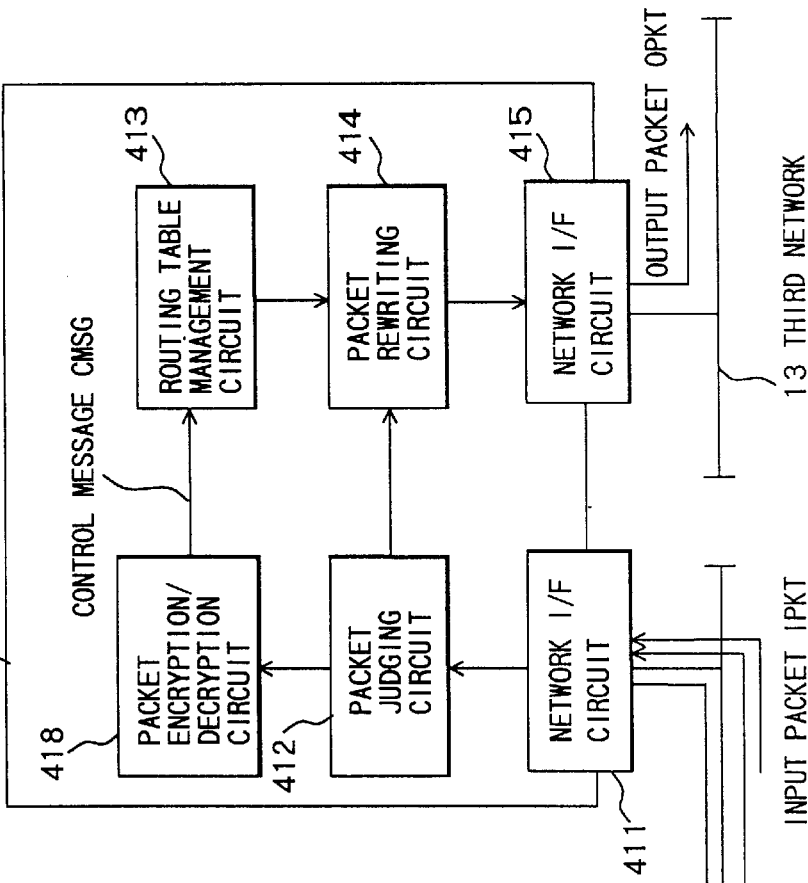
FIG. 14 is a block diagram illustrating an architecture of a control system in a fifth embodiment of the present invention.

FIG. 14 shows an architecture of the communications network control system in a fifth embodiment of the present invention. This control system corresponds to the second communications network control system SYS2 in the communication network control system SYS shown in FIG. 1. In the control system SYS2 in the fifth embodiment, a packet encryption/decryption circuit 418 is added to the packet transfer device 41 in the control system SYS2 in the second embodiment discussed above, and an encryption/decryption circuit 513 is added to the network control device 51.

Figure 15:
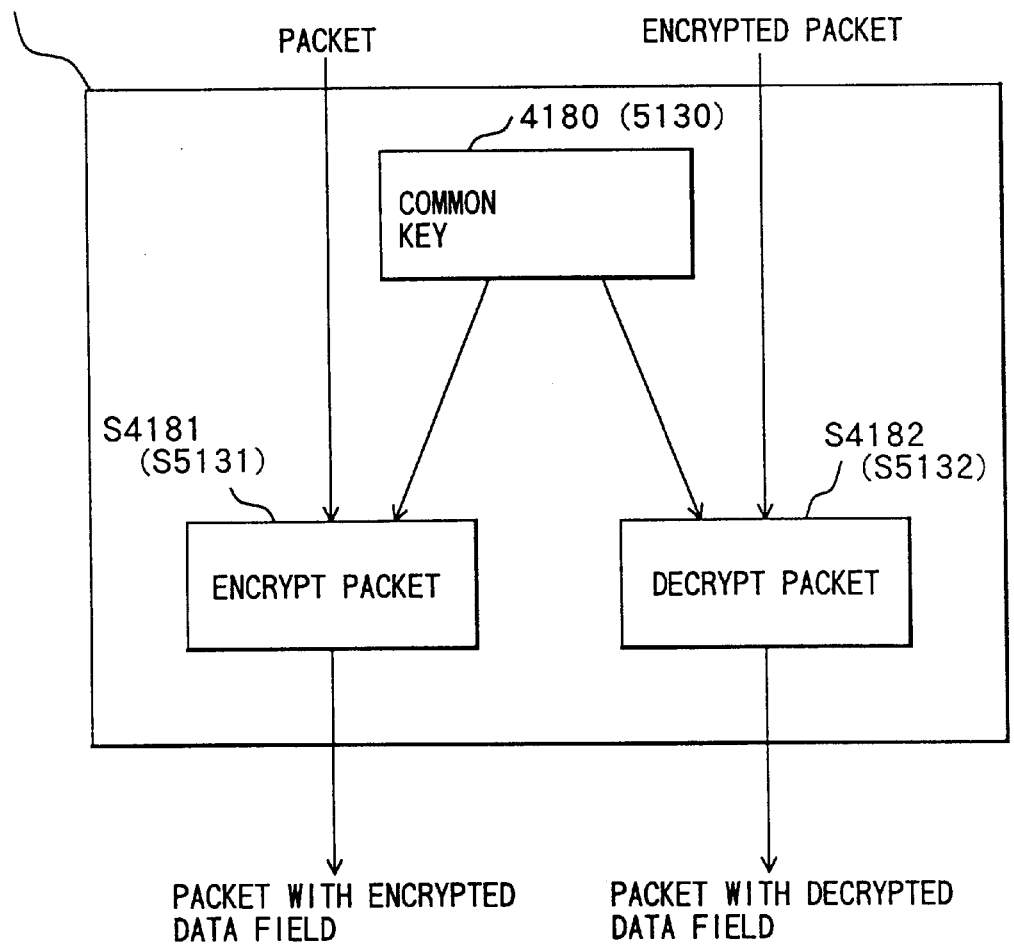
FIG. 15 is an explanatory diagram showing an operation of a packet encryption/decryption circuit in the control system shown in FIG. 14.

Referring to FIGS. 14 to 15, in the communications network control system SYS2, the packet judging circuit 412 judges whether or not the input packet IPKT inputted via the network interface circuit 411 of the packet transfer device 41 is the control protocol packet CPKT. The packet, which has been judged to be the control protocol packet CPKT by the packet judging circuit 412, is encrypted based on a common encryption key 4180 (see FIG. 15) by the packet encryption/decryption circuit 418 (a processing step S4181), and is transmitted to the network control device 51 via the network interface circuit 411 and the second network 12. In the network control device 51, the encrypted control protocol packet CPKT is inputted to the packet encryption/decryption circuit 513 via the network interface circuit 511. The packet encryption/decryption circuit 513 decrypts, based on the common encryption key 5130, the data field of the control protocol packet CPKT (S5132), and transfers the decrypted data field to the control information management circuit 512. The packet encryption/decryption circuit 513 obtains the control message CMSG processed by the control information management circuit 512. This control message CMSG is encrypted based on the common key 5130 by the packet encryption/decryption circuit 513 (S5131), and is transmitted to the packet transfer device 41 via the interface circuit 511 and the second network 12. In the packet transfer device 41, the packet judging circuit 412 identifies the encrypted control message CMSG received by the interface circuit 411, and transfers the message to the packet encryption/decryption circuit 418. The packet encryption/decryption circuit 418 decrypts, based on the common key 4180, the encrypted control message CMSG (S4182), and transfers the message to the routing table management circuit 413. Note that the packet encryption/decryption circuits 418, 518 may involve the use of a known method such as, e.g., the DES (Data Encryption Standard). Other components of which the explanations are omitted herein are the same as those in the second embodiment.

With this construction, it is feasible to encrypt the control message CMSG and the control protocol packet CPKT of the routing protocol which are transferred and received between the packet transfer device 41 and the network control device 51. As a result, the safety communications can be actualized by preventing risks such as tapping on the network.

(Other Modified Examples)

The control systems in the second through fifth embodiments discussed above have dealt with the routing control. Similarly in the case of the quality management control, the load dispersion control and the access control in the network, however, the control can be performed in such a way that the control protocol packet CPKT corresponding to the relevant control is transferred to the network control device 51 from the packet transfer device 41, then the network control device 51 creates the control message CMSG on the basis of this packet, and the message is transferred back to the packet transfer device 41.

The control system may also be constructed of the communications network control system of which the whole architecture is illustrated by way of one example in FIG. 1. Further, the network control device 51 in FIG. 1 may also take a construction for controlling both of the packet transfer devices 21 and 41.

Although only a few embodiments of this invention have been described in detail above, those skilled in the art will readily appreciate that many modifications are possible in the preferred embodiments without departing from the novel teachings and advantages of this invention. Accordingly, all such modifications are intended to be included within the scope of his invention as defined by the following claims.

What is claimed is:

1. A communications network control system comprising:
    judging means for judging whether a variable-length packet inputted via a first network is a control packet self-addressed and containing control information for network control, or a transfer packet addressed otherwise;
    first managing means for receiving the control packet judged to be the control packet by said judging means via a communications medium, and managing and processing the control information, based on the received control packet;
    second managing means for storing the control information transmitted to said communications medium from said first managing means in such a way that the control information can be updated as well as for controlling a transfer of the transfer packet; and
    rewriting means for executing a process of rewriting contents of the transfer packet in accordance with the control information stored in said second managing means, even during processing of the control information of the received control packet by said first managing means, in order to transfer to a second network the transfer packet judged to be the transfer packet by said judging means.

2. A communications network control system according to claim 1, wherein said communications medium is said first network.

3. A communications network control system according to claim 1, wherein said communications medium is a cable through which said first managing means, said judging means and said second managing means are capable to communicating with each other.

4. A communications network control system according to claim 1, wherein said first managing means is provided in a first device, and said judging means, said second managing means and said rewriting means are provided in a second device having a physically different configuration from said first device.

5. A communications network control system according to claim 4, wherein said communications medium is said first network.

6. A communications network control system according to claim 4, wherein said communications medium is a cable through which said first device and said second device are capable of communicating with each other.

7. A communications network control system according to claim 5, wherein said first device and said second device each have connecting means for a connection to said first network, and communicate with each other via said connecting means.

8. A communications network control system according to claim 6, wherein said first device and said second device each have connecting means for a connection to said cable, and communicate with each other via said connecting means.

9. A communications network control system according to claim 7, wherein said second device further includes address rewriting means for rewriting a destination address of the control packet into an address of said first device, and transfers the control packet after being rewritten to said first device in accordance with the address.

10. A communications network control system according to claim 7, wherein said second device further includes header adding means for adding to the control packet a header addressed to said first device, and transfers to said first device the control packet to which the header has already been added in accordance with an address of the header.

11. A communications network control system according to claim 9, wherein each of said first device and said second device further includes a control packet encrypting/decrypting means for making confidential the communications via said first network.

12. A communications network control system comprising:
    judging means for judging whether a variable-length packet inputted via a network is a control packet self-addressed and containing control information for network control, or a transfer packet addressed otherwise;
    first managing means for receiving the control packet judged to be the control packet by said judging means via a communications medium, and managing and processing the control information, based on the received control packet;

second managing means for storing the control information transmitted to said communications medium from said first managing means in such a way that the control information can be updated as well as for controlling a transfer of the transfer packet; and rewriting means for executing a process of rewriting contents of the transfer packet in accordance with the control information stored in said second managing means even during processing of the control information of the received control packet by said first managing means in order to transfer to the other network the transfer packet judged to be the transfer packet by said judging means, wherein said first managing means is provided in at least one network control device, said judging means, said second managing means and said rewriting means are provided in at least one packet transfer device, and said communications medium is one of one of the network and the other network, and the cable through which said network control device and said packet transfer device are capable of communicating with each other.

13. A communications network control system according to claim 12, wherein said packet transfer device with one of the network and the other network serving as the communications medium, further includes address rewriting means for rewriting a destination address of the control packet into an address of said network control device, and transfers the control packet with the already-rewritten address to said network control device in accordance with the address.

14. A communications network control system according to claim 12, wherein said packet transfer device with one of the network and the other network serving as the communications medium, further includes header adding means for adding to the control packet a header addressed to said network control device, and transfers, to said network control device, the control packet to which the header has already been added in accordance with the address of the header.

15. A communications network control system according to claim 13, wherein each of said network control device and said packet transfer device with one of the network and the other network serving as the communications medium, further includes control packet encrypting/decrypting means in order to make confidential the communications via said communications medium.

16. A communications network control method comprising:

judging whether a variable-length packet inputted via a first network is a control packet self-addressed and containing control information for network control, or a transfer packet addressed otherwise;

receiving the control packet judged to be the control packet in said first step via a communications medium, and managing and processing the control information, based on the received control packet;

storing the control information transmitted to said communications medium by the process in said receiving in such a way that the control information can be updated as well as for controlling a transfer of the transfer packet; and executing a process of rewriting contents of the transfer packet in accordance with the control information stored in said storing, even during processing of the control information of the received control packet received in said receiving, in order to transfer to a second network the transfer packet judged to be the transfer packet in said judging.

* * * * *

UNITED STATES PATENT AND TRADEMARK OFFICE
CERTIFICATE OF CORRECTION

PATENT NO. : 6,625,147 B1
DATED : September 23, 2003
INVENTOR(S) : Ken Yokoyama et al.

It is certified that error appears in the above-identified patent and that said Letters Patent is hereby corrected as shown below:

Column 14,
Line 20, insert a paragraph brake after "first device, and"

Signed and Sealed this

Third Day of February, 2004

JON W. DUDAS
*Acting Director of the United States Patent and Trademark Office*